(12) United States Patent
Shahana (10) Patent No.: US 7,396,304 B2
(45) Date of Patent: Jul. 8, 2008

(54) BICYCLE REAR DERAILLEUR

(75) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 614 days.

(21) Appl. No.: 10/931,226

(22) Filed: Sep. 1, 2004

(65) Prior Publication Data
US 2006/0058135 A1    Mar. 16, 2006

(51) Int. Cl.
*B62M 9/12* (2006.01)
*F16H 61/00* (2006.01)

(52) U.S. Cl. .......................................... 474/82; 474/80

(58) Field of Classification Search ............. 474/78–83; D12/124; 403/11, 188; 411/531, 544, 546; 74/489; 280/257
See application file for complete search history.

(56) References Cited

U.S. PATENT DOCUMENTS

| | | | | |
|---|---|---|---|---|
| 3,903,751 A | * | 9/1975 | Dian | 474/82 |
| 4,183,255 A | * | 1/1980 | Leiter | 474/82 |
| 4,269,601 A | | 5/1981 | Nagano | |
| 4,470,823 A | | 9/1984 | Shimano | |
| 4,690,663 A | | 9/1987 | Nagano | |
| 4,789,379 A | * | 12/1988 | Ozaki et al. | 474/82 |
| RE32,924 E | | 5/1989 | Nagano | |
| 5,397,273 A | * | 3/1995 | Ando | 474/82 |
| 5,494,307 A | * | 2/1996 | Anderson | 280/236 |
| 5,624,334 A | | 4/1997 | Lumpkin | |
| 5,904,629 A | | 5/1999 | Oka | |
| 5,919,106 A | | 7/1999 | Ichida | |
| 5,931,753 A | | 8/1999 | Ichida | |
| D424,984 S | * | 5/2000 | Hanamura | D12/124 |
| 6,135,905 A | | 10/2000 | Soon | |
| 6,287,228 B1 | | 9/2001 | Ichida | |
| 7,125,354 B2 | * | 10/2006 | Shahana | 474/82 |
| 2004/0110586 A1 | | 6/2004 | Shahana et al. | |
| 2004/0110587 A1 | | 6/2004 | Shahana et al. | |
| 2004/0116222 A1 | | 6/2004 | Shahana et al. | |

FOREIGN PATENT DOCUMENTS

| | | | |
|---|---|---|---|
| EP | 0191710 A2 | * | 1/1985 |
| EP | 1428746 A2 | * | 6/2004 |
| JP | 2004148983 A | * | 5/2004 |

* cited by examiner

*Primary Examiner*—Marcus Charles
(74) *Attorney, Agent, or Firm*—Global IP Counselors, LLP (57) ABSTRACT

A bicycle rear derailleur is provided that includes a base member, a movable member with a chain guide and a linkage mechanism. The linkage mechanism is coupled between the base member and a movable member to move the chain guide laterally. The base member is configured to be coupled to the bicycle frame. Preferably, at least part of the base member is configured and arranged to be rotatable about a pivot axis that is coincident with a center axis of a rear hub axle. Specifically, the base member preferably includes a fixing portion that is non-movably fixed to the frame and a derailleur support portion that is rotatable relative to the fixing portion. Moreover, the fixing portion preferably includes a cable support structure that is configured to support a derailleur control cable.

27 Claims, 9 Drawing Sheets

BICYCLE REAR DERAILLEUR

BACKGROUND OF THE INVENTION

1. Field of the Invention

This invention generally relates to a bicycle derailleur. More specifically, the present invention relates to a rear bicycle derailleur, which is preferably mountable on the end of a rear hub axle, and which preferably includes a cable support structure that is non-movable relative to the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle derailleur.

Typically, a bicycle derailleur has a base member and a chain guide movably coupled to the base member via a linkage assembly. The base member is coupled to the frame of the bicycle. The chain guide is configured to move the chain laterally over a plurality of rear sprockets. A spring typically biases the chain guide to an innermost or outermost position relative to the sprockets. A Bowden-type control cable with an outer sheath and an inner wire is typically coupled to the derailleur and to a conventional shift control device.

The chain guide of a derailleur includes a pair of shift or guide plates arranged to move the chain laterally back and forth. The rear chain guide includes a pair of pulleys mounted between the shift plates, while the front chain guide is absent pulleys. With the rear chain guide, the chain is wrapped around both pulleys in an S-shaped manner between the guide plates in order to efficiently guide the chain to the appropriate sprocket during shifting and in order to appropriately tension the chain. The front derailleur is usually coupled to the seat tube of the frame, while the rear derailleur is usually coupled to the rear triangle of the bicycle frame adjacent the rear wheel.

The rear derailleur is usually mounted at a spaced location from the hub axle. Thus, the frame often has a portion extending away from the hub axle to which the rear derailleur is mounted. The rear derailleur also usually has a mounting structure for mounting it to the frame extension. While this arrangement works well, this type of arrangement is relatively complicated using numerous parts. Thus, this type of arrangement can be relatively heavy. Moreover, this type of arrangement can be relatively complicated and/or expensive to manufacture and/or assemble due to the numerous parts. Additionally, typical rear derailleurs have a base member that pivots about a fixed member that is fixed to the frame extension. The movable base member usually has an outer cable holder that receives the outer sheath of the shift cable. The cable holder moves when base member moves. While such an arrangement works well, such an arrangement can lead to decreased shifting performance that is not as effective as desired by some riders.

In view of the above, it will be apparent to those skilled in the art from this disclosure that there exists a need for an improved bicycle derailleur. This invention addresses this need in the art as well as other needs, which will become apparent to those skilled in the art from this disclosure.

SUMMARY OF THE INVENTION

One object of the present invention is to provide a bicycle derailleur, which smoothly and reliably shifts the chain over a plurality of rear sprockets.

Another object of the present invention is to provide a rear bicycle derailleur that is relatively simple and inexpensive to manufacture, assemble and mount to the bicycle.

Still another object of the present invention is to provide a bicycle derailleur that is strong, yet relatively lightweight.

The foregoing objects can basically be attained by providing a bicycle rear derailleur that comprises a base member, a movable member and a linkage mechanism. The base member is configured and arranged to be coupled to a bicycle frame. The movable member has a chain guide. The linkage mechanism is coupled between the base member and a movable member to move the chain guide laterally between a first position and a second position. At least part of the base member is configured and arranged to be rotatable about a pivot axis that is coincident with a center axis of a rear hub axle.

The foregoing objects can also basically be attained by providing a bicycle rear derailleur that comprises a base member, a movable member and a linkage mechanism. The base member is configured and arranged to be coupled to a bicycle frame. The movable member has a chain guide. The linkage mechanism is coupled between the base member and a movable member to move the chain guide laterally between a retracted position and an extended position. The base member includes a fixing portion and a derailleur support portion. The fixing portion is configured and arranged to be non-movably fixed to the bicycle frame. The derailleur support portion is coupled to the fixing portion for rotation relative thereto about a pivot axis. The derailleur support portion has the linkage mechanism coupled thereto. The fixing portion includes a cable support structure attached thereto that is configured and arranged to support a derailleur control cable.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
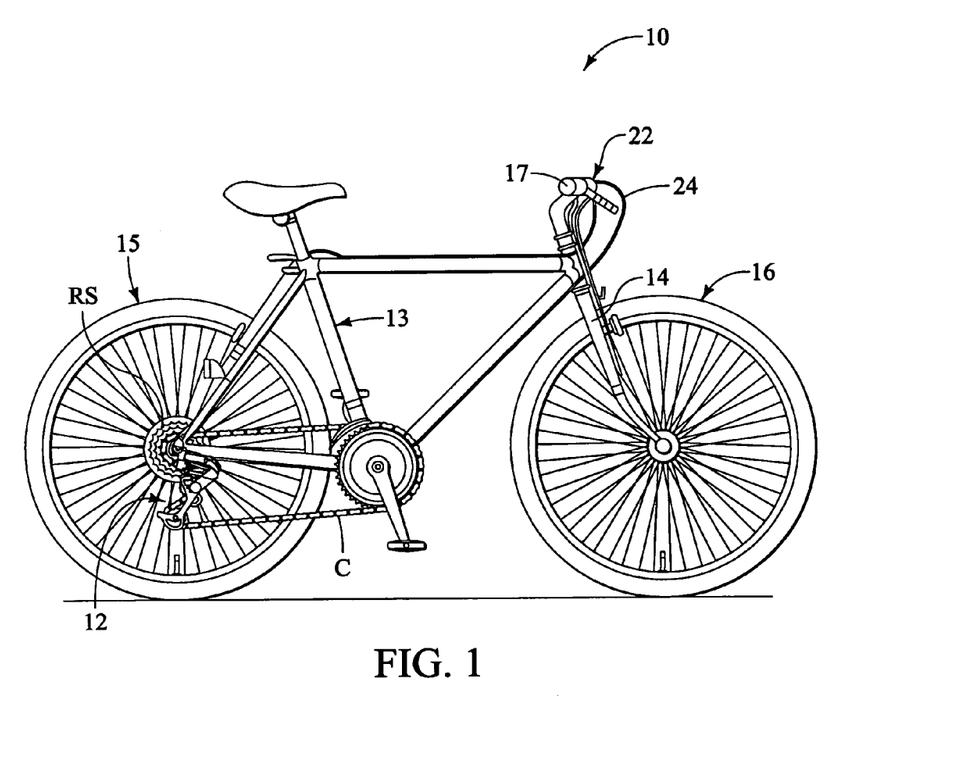
FIG. 1 is a side elevational view of a bicycle equipped with a rear derailleur in accordance with a preferred embodiment of the present invention.
Figure 2:
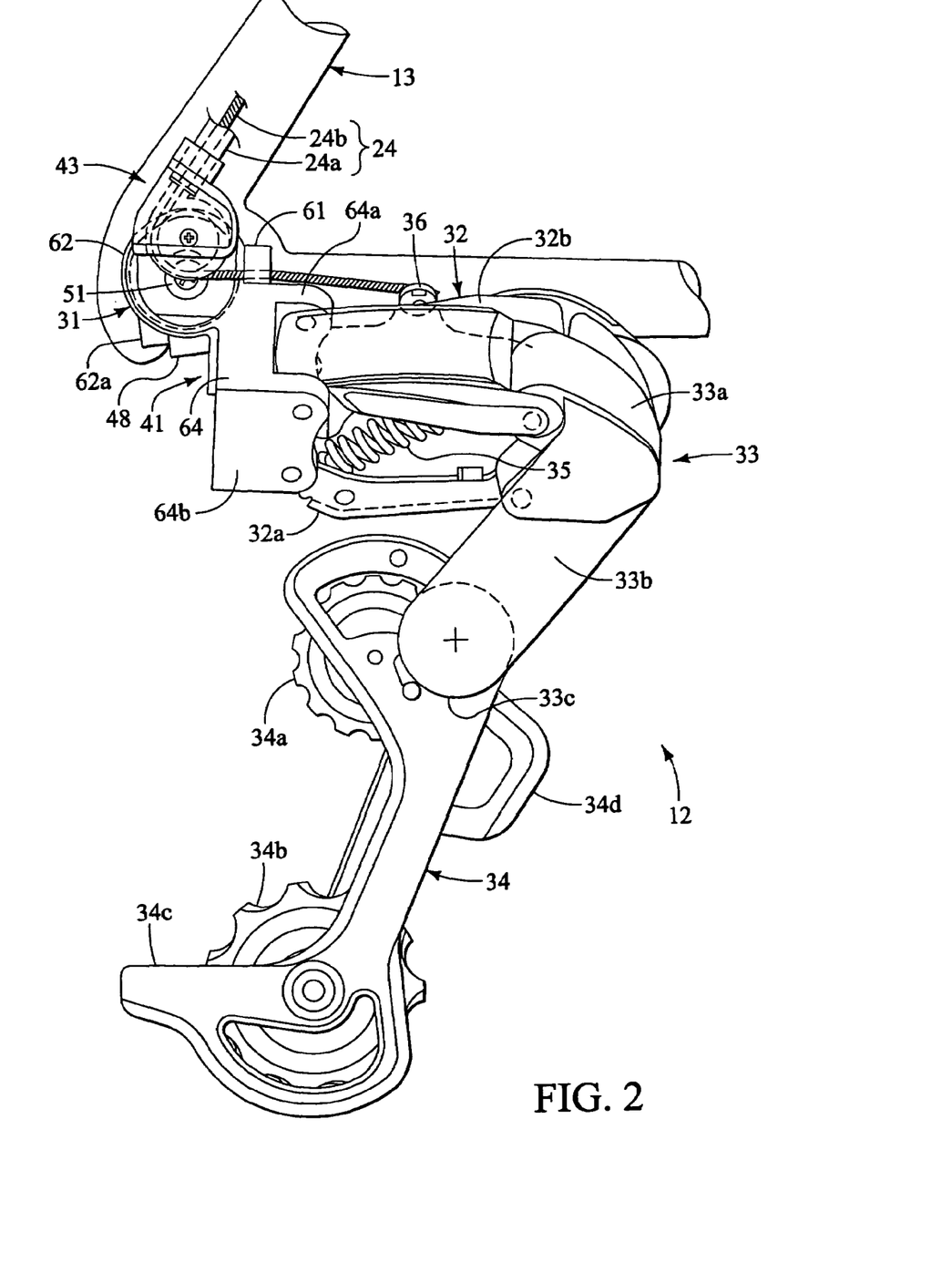
FIG. 2 is an enlarged, side elevational view of the rear derailleur illustrated in FIG. 1, with portions of the bicycle removed for the purpose of illustration.
Figure 3:
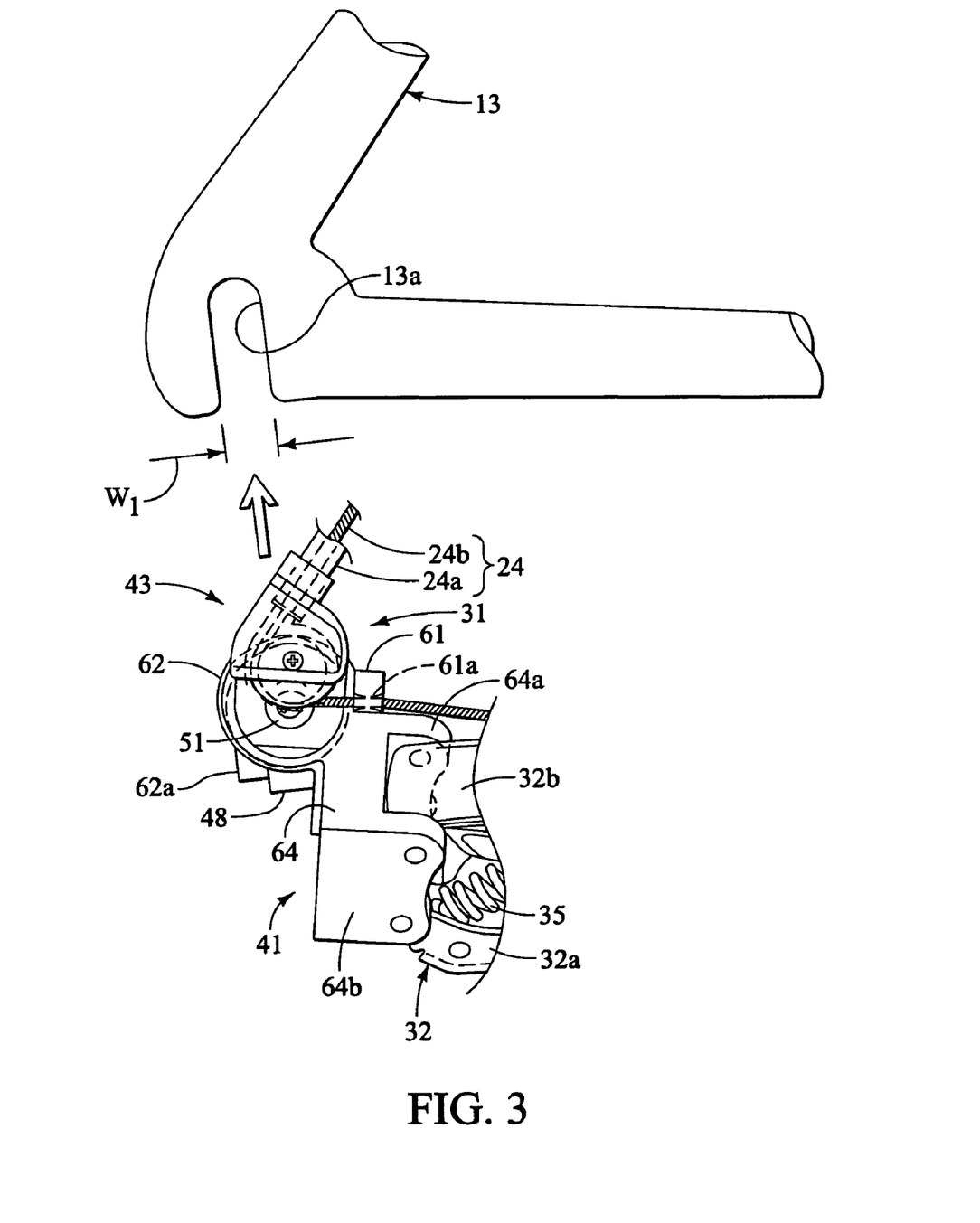
FIG. 3 is a partial side elevational view of the rear derailleur and portion of the bicycle illustrated in FIG. 2, with the base member of the rear derailleur removed from the bicycle for the purpose of illustration.
Figure 4:
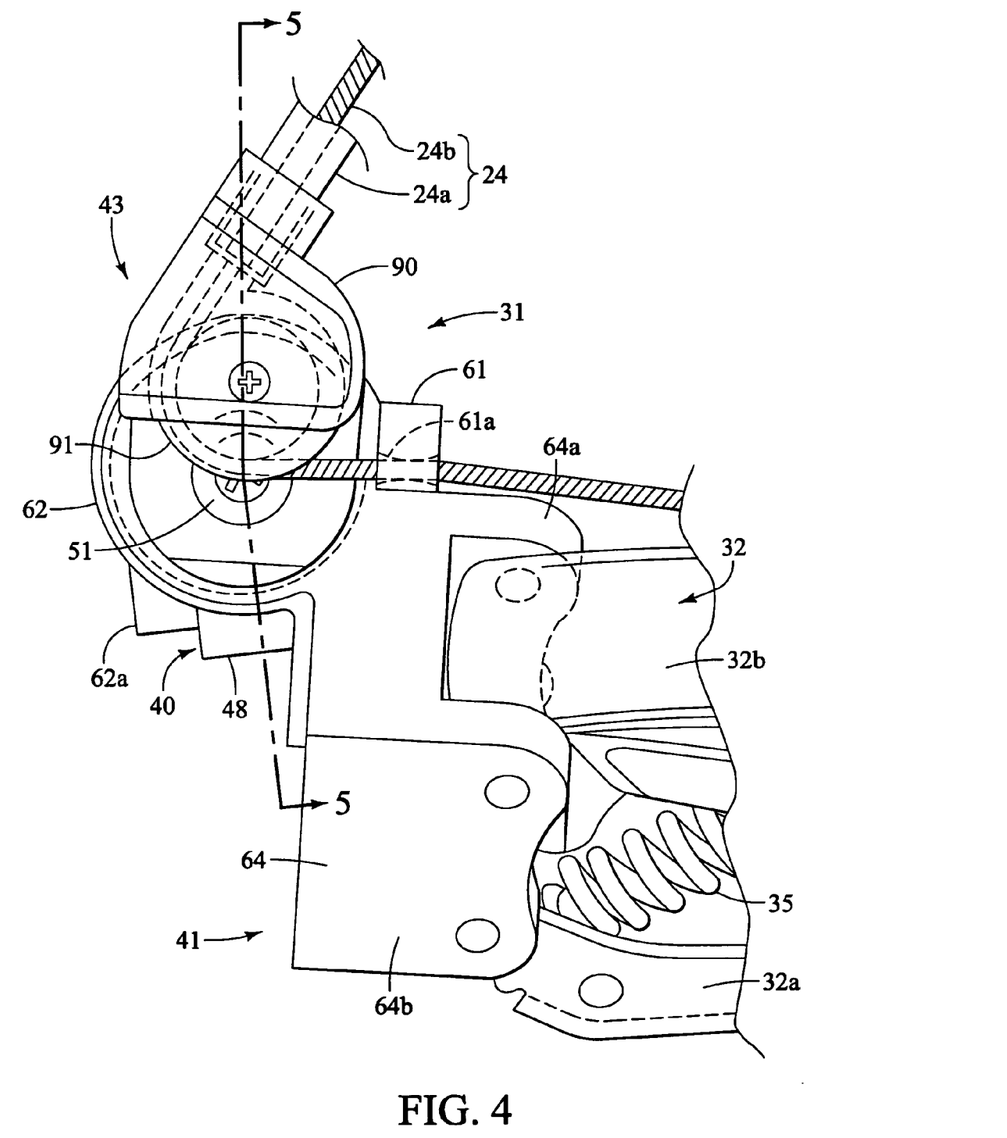
FIG. 4 is a further enlarged, side elevational view of the portion of the rear derailleur illustrated in FIG. 3.
Figure 5:
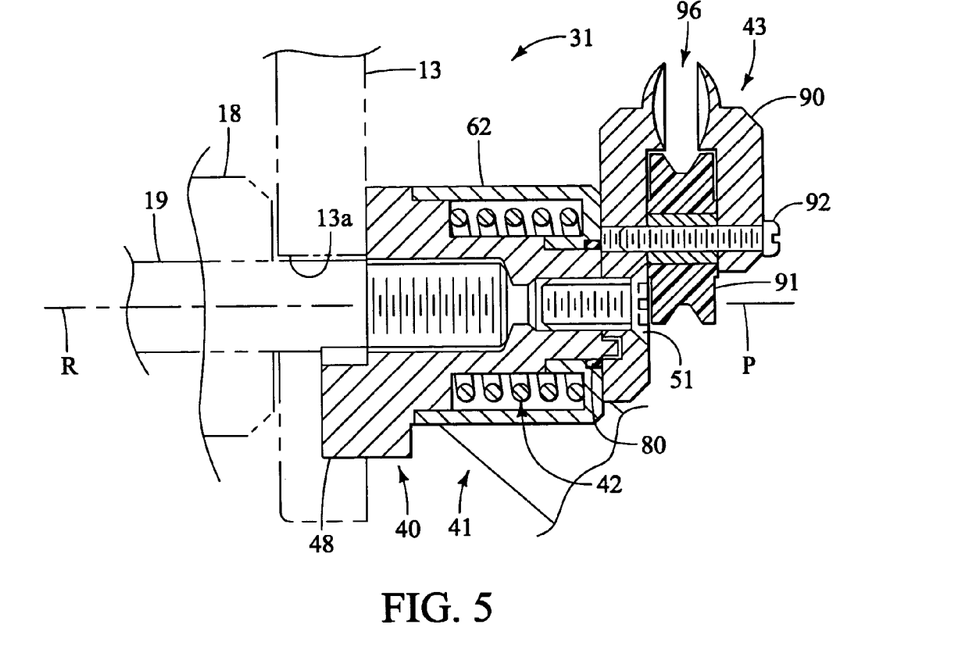
FIG. 5 is a partial, cross-sectional view of the portion of the rear derailleur illustrated in FIG. 4 as seen along section line 5-5 of FIG. 4, with the bicycle frame and rear hub illustrated in phantom lines for the purpose of illustration.
Figure 6:
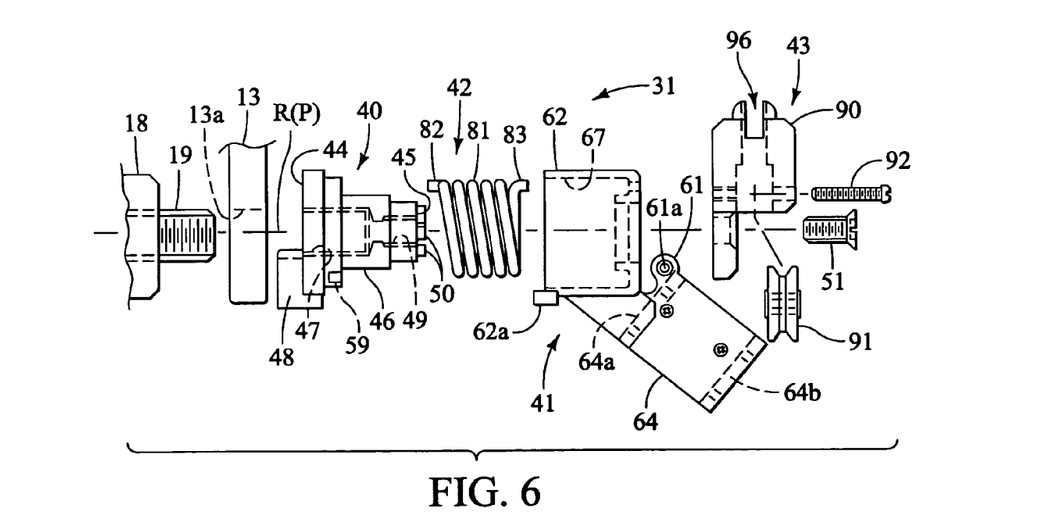
FIG. 6 is an exploded, rear elevational view (on a reduced scale) of the base member of the rear derailleur illustrated in FIGS. 4 and 5.
Figures 7, 8:
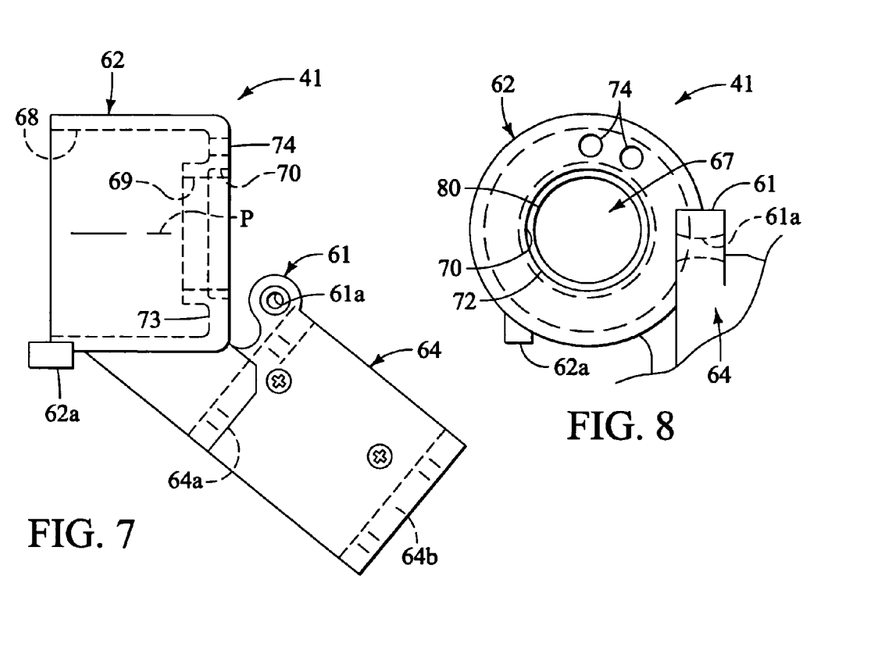
FIG. 7 is a rear elevational view of the derailleur support portion of the base member illustrated in FIGS. 4 and 5.
FIG. 8 is an outer side elevational view of the derailleur support portion of the base member illustrated in FIGS. 4, 5 and 7.
Figure 9:
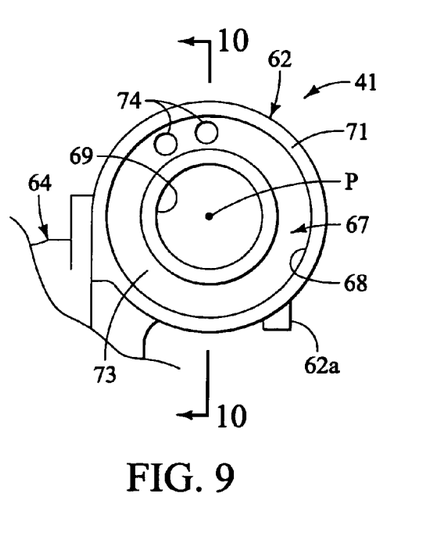
FIG. 9 is an inner side elevational view of the derailleur support portion of the base member illustrated in FIGS. 4, 5, 7 and 8.
Figure 10:
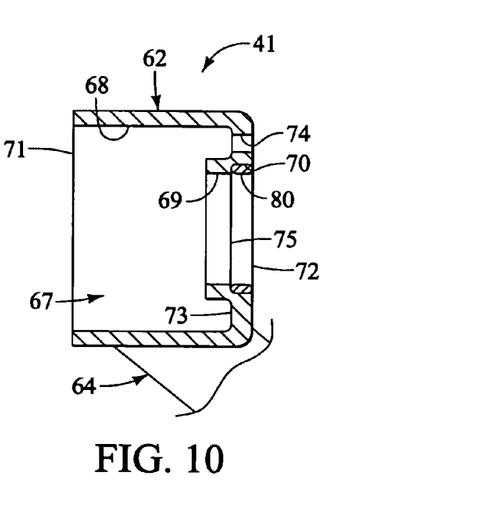
FIG. 10 is a cross-sectional view of the derailleur support portion of the base member illustrated in FIGS. 4, 5 and 7-9, as seen along section line 10-10 of FIG. 9.
Figure 11:
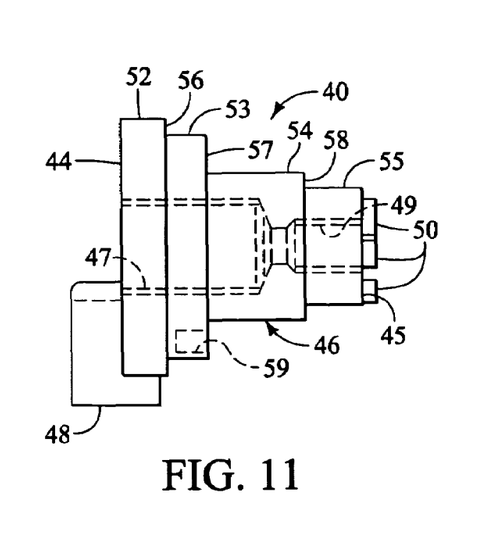
FIG. 11 is a rear elevational view of the fixing portion of the base member illustrated in FIGS. 4 and 5.
Figure 12:
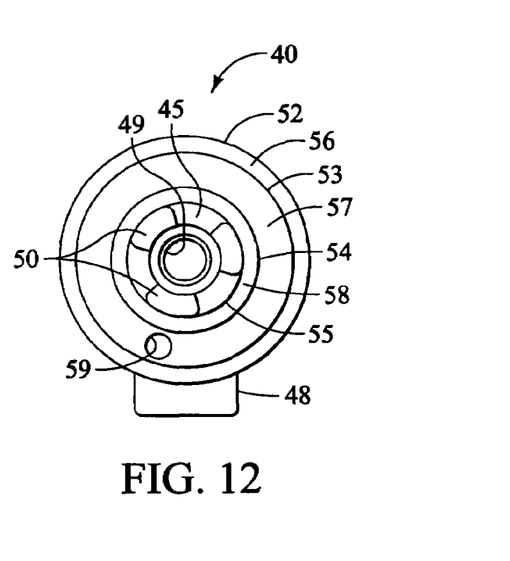
FIG. 12 is an outer side elevational view of the fixing portion of the base member illustrated in FIGS. 4, 5 and 11.
Figure 13:
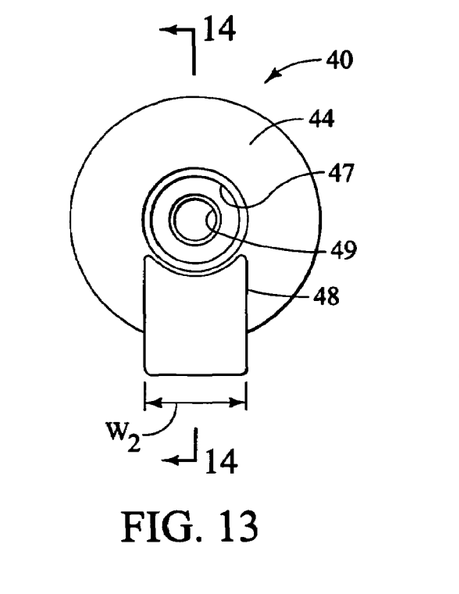
FIG. 13 is an inner side elevational view of the fixing portion of the base member illustrated in FIGS. 4, 5, 11 and 12.
Figure 14:
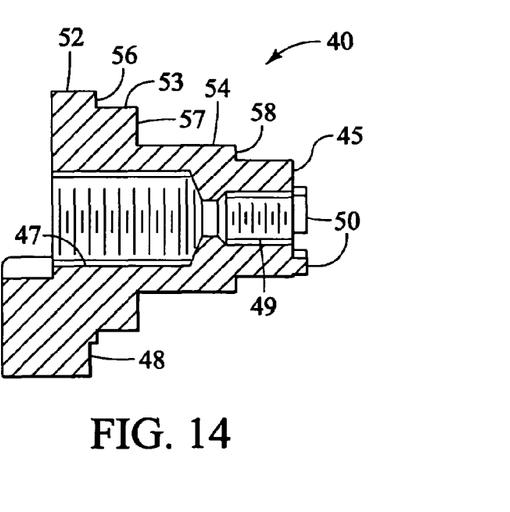
FIG. 14 is a cross-sectional view of the fixing portion of the base member illustrated in FIGS. 4, 5 and 11-13, as seen along section line 14-14 of FIG. 13.
Figure 15:
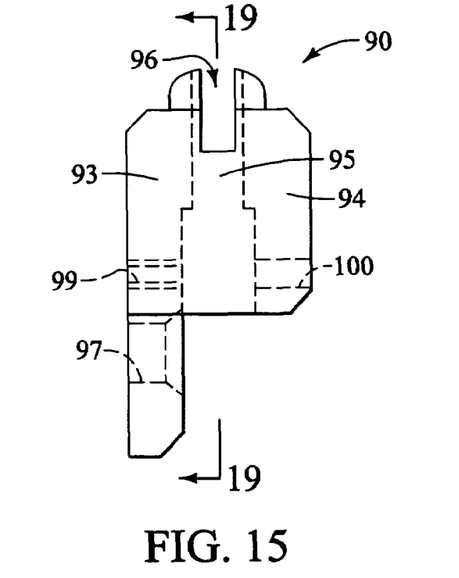
FIG. 15 is a rear elevational view of the mounting member of the cable support structure of the base member illustrated in FIGS. 4 and 5.
Figure 16:
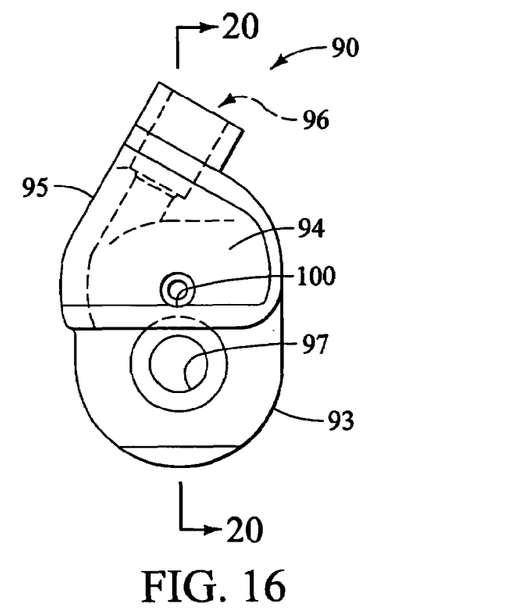
FIG. 16 is an outer side elevational view of the mounting member of the base member illustrated in FIGS. 4, 5 and 15.
Figure 17:
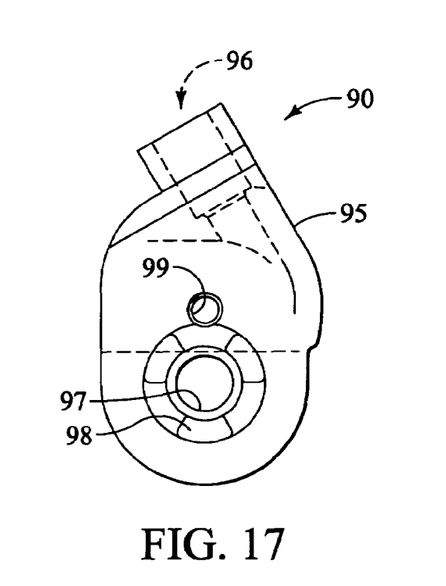
FIG. 17 is an inner side elevational view of mounting member of the base member illustrated in FIGS. 4, 5, 15 and 16.
Figure 18:
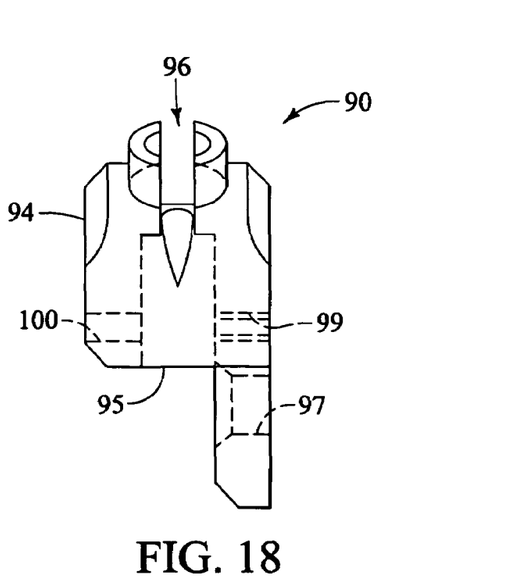
FIG. 18 is a front elevational view of the mounting member of the base member illustrated in FIGS. 4, 5 and 15-17.
Figure 19:
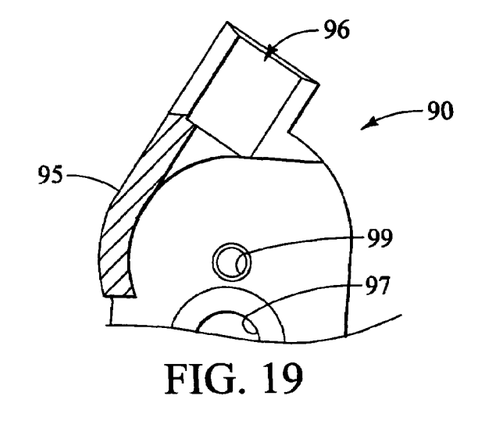
FIG. 19 is a partial cross-sectional view of the mounting member of the base member illustrated in FIGS. 4, 5 and 15-18, as seen along section line 19-19 of FIG. 15.
Figure 20:
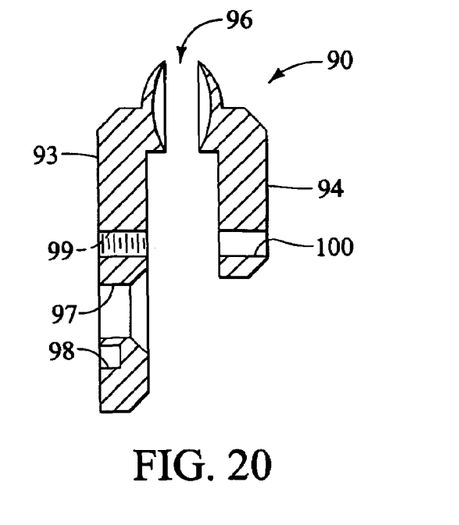
FIG. 20 is a cross-sectional view of the mounting member of the base member illustrated in FIGS. 4, 5 and 15-19, as seen along section line 20-20 of FIG. 16.
Figure 21:
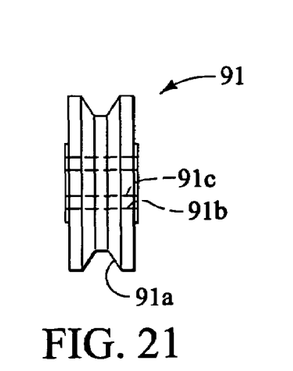
FIG. 21 is an end elevational view of the wire roller of the cable support structure of the base member illustrated in FIGS. 4 and 5.
Figure 22:
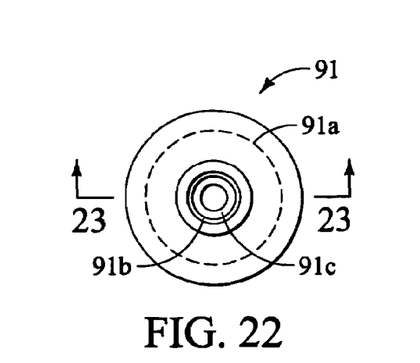
FIG. 22 is a side elevational view of the wire roller of the base member illustrated in FIGS. 4, 5 and 21.
Figure 23:
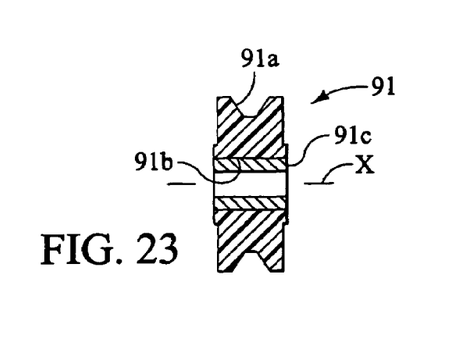
FIG. 23 is a cross-sectional view of the wire roller of the base member illustrated in FIGS. 4, 5, 21 and 22.

Referring initially to FIGS. 1 and 2, a bicycle 10 is illustrated that is equipped with a rear derailleur 12 in accordance with a preferred embodiment of the present invention. The bicycle 10 is basically conventional, except for the rear derailleur 12. Thus, the bicycle 10 will not be discussed and/or illustrated in detail herein, except as related to the rear derailleur 12. The bicycle 10 basically includes a frame 13 with a front fork 14 pivotally coupled thereto and a pair of wheels 15 and 16 coupled to the frame 13 and the front fork 14, respectively. The rear wheel 15 is coupled to the rear triangle of the frame 13 in a conventional manner, except that the rear derailleur 12 is coupled to the rear wheel 15 in accordance with the present invention, as explained below in more detail. The front wheel 16 is coupled to the front fork 14 in a conventional manner.

The front fork 14 has a handle bar 17 coupled to the front fork 14 in a conventional manner to steer the front wheel 16.

The rear wheel 15 has a rear hub 18 with an axle 19 that is coupled to the rear triangle portion of the frame 13. Preferably, the rear derailleur 12 is mounted directly to the rear hub 18, i.e., the axle 19 of the rear hub 18 in accordance with the present invention. The rear hub 18 has a plurality of rear sprockets RS mounted on a free wheel of the rear hub 18 in a conventional manner. The rear hub 18 and the rear wheel 15 are conventional, except that the rear hub 18 has the rear derailleur 12 coupled thereto in accordance with the present invention, as explained below in more detail. Accordingly. The rear hub 18 will not be discussed and illustrated in detail herein. Rather, the rear hub 18 will only be discussed and illustrated such that one of ordinary skill in the art can make and use the rear derailleur 12 of the present invention.

The rear derailleur 12 is operatively coupled to a rear shifter 22 via a rear derailleur control cable 24. The rear shifter 22 is preferably mounted on the handlebar 17 to control the rear derailleur 12 via the derailleur control cable 24 in a relatively conventional manner to move a chain C laterally over the rear sprockets RS. In other words, the rear shifter 22 is conventional. Thus, the rear shifter 22 will not be discussed in further detail herein. The rear derailleur control cable 24 is preferably a Bowden type cable having a protective outer sleeve or casing 24a and an inner wire 24b. One end of the rear derailleur control cable 24 is coupled to the rear shifter 22, while the other end is coupled to the rear derailleur 12 in accordance with the present invention, as explained below.

Referring now to FIGS. 1-6, the rear derailleur 12 basically includes a base member 31, a linkage assembly or mechanism 32 and a movable member 33 with a chain guide 34. A biasing element or spring 35 is preferably coupled between a pair of the parts of the rear derailleur 12 to bias the chain guide 34 to either one of its top gear position or its bottom gear position, depending on the type of rear derailleur in a conventional manner.

In the illustrated embodiment, the linkage mechanism 32 includes an inner link 32a and an outer link 32b. The inner link 32a includes an inner wire attachment bolt 36 for attaching the inner wire 24b of the rear derailleur control cable 24 thereto. A first end of the inner link 32a is pivotally attached to the base member 31 by a first pivot pin, while a second end of the inner link 32a is pivotally attached to the movable member 33 by a second pivot pin. Similarly, a first end of the outer link 32b is pivotally attached to the base member 31 by a third pivot pin, while a second end of the outer link 32b is pivotally attached to the movable member 33 by a fourth pivot pin. Thus, the base member 31, the movable member 33, the inner link 32a and an outer link 32b form a four bar linkage arrangement to move the chain guide 34 laterally between a plurality of shift positions (e.g. a first position and a second position) in a conventional manner.

The movable member 33 functions in a conventional manner. However, the movable member 33 has a substantially Z-shaped configuration with a linkage mounting section 33a, an elongated central section 33b and a chain guide mounting section 33c as viewed in front elevation. The elongated central section 33b and the chain guide mounting section 33c form a substantially L-shaped configuration as viewed in front elevation (i.e., an acute angle of about 80 degrees therebetween). Specifically, because the rear derailleur 12 is designed to be directly mounted on the rear hub axle 19 such that parts of the base member 31 pivot relative thereto, the movable member 33 has the elongated section 33b such that the chain guide 34 is located in the appropriate position to shift the chain C laterally over all the rear sprockets RS, as best seen in FIG. 2. Due to this arrangement, the chain guide pivot axis is always located below the linkage mechanism (e.g. when the rear derailleur 12 is in a top position and a bottom position).

The chain guide 34 is coupled to the movable member 33 in a conventional manner such that the chain guide 34 pivots relative to the movable member 33. Specifically, the chain guide 34 is pivotally coupled to the chain guide mounting section 33c of the movable member 33. The chain guide 34 basically includes two pulleys 34a and 34b that are mounted between a pair of chain guide plates 34c and 34d. The chain guide 34 is pivotally mounted to the movable member 33 in a conventional manner with a torsion spring (not shown) interposed therebetween.

In this embodiment, the biasing member or spring 35 normally biases the chain guide 34 toward the inner most (largest) of the rear sprockets RS (i.e. toward a retracted position from an extended position). The movable member 33, the linkage mechanism 32, the chain guide 34 and the biasing member 35 form parts of a second member that is movably coupled relative to the first member (base member 31). In the illustrated embodiment, the biasing member 35 is a coiled tension spring that is attached at one end to the base member 31 (i.e., the pivot pin that couples the inner link 32a to the base member 31) and attached at the other end to the outer link 32b of the linkage mechanism 32 to bias the chain guide 34 to the low or bottom gear position. Thus, the chain guide 34 is biased towards the center plane of the bicycle 10.

Basically, the structure of the base member 31 is unique while the precise structures of the remaining parts of the rear derailleur 12 are not critical to the present invention, except as explained and illustrated herein. Thus, the remaining parts of the rear derailleur 12 will not be discussed in further detail, but rather the following description will focus on the base member 31 of the rear derailleur 12.

Referring still to FIGS. 2-6, the base member 31 of the rear derailleur 12 is mounted directly on the axle 19 of the rear hub 18 such that a separate mounting arrangement is not used. Basically, the base member 31 includes a fixing portion 40, a derailleur support portion 41, a biasing member or element 42 and a cable support structure 43. The fixing portion 40 is configured and arranged to be fixedly coupled to the axle 19 of the rear hub 18. The derailleur support portion 41 is configured and arranged to be rotatably mounted about the fixing portion 40 for limited rotational movement relative thereto. The cable support structure 43 is fixedly coupled to the fixing portion 40. The biasing member 42 is operatively disposed between the fixing portion 40 and the derailleur support portion 41 for biasing the derailleur support portion 41 relative to the fixing portion 40 to a rest position. The cable support structure 43 is configured and arranged to support the derailleur control cable 24. Thus, the fixing portion 40 and the cable support structure 43 are stationary (non-movable) members relative to the frame 13. The derailleur support portion 41, on the other hand, is movably coupled to the base member 31 relative to the frame 13 such that the linkage mechanism 32, the movable member 33 and the chain guide 34 all move together about a pivot axis P that is coincident with a rotational axis R of the axle 19 of the rear hub 18 (substantially above the linkage mechanism 32).

Referring now to FIGS. 2-6 and 11-14, the fixing portion 40 is preferably formed as a one-piece, unitary member from a hard, rigid material such as a lightweight metal (e.g. aluminum alloy). The fixing portion 40 is configured and arranged to be threadedly attached to an end of the bicycle hub axle 19 such that the pivot axis P of the fixing portion 40 is coincident with the center rotational axis R of the hub axle 19. The fixing portion 40 includes a first inner end face 44, a second outer end face 45 and a stepped shaped peripheral surface 46 extending between the end faces 44 and 45. The end faces 44 and 45 are axially opposed with at least a portion of the inner end face 44 engaging the bicycle frame 13. At least a portion of the second outer end face 45 engages or supports the cable support structure 43, as set forth below.

The inner end face 44 has a centrally located threaded mounting hole 47 and a frame contacting projection 48. The threaded mounting hole 47 is configured and arranged to threadedly receive the end of the hub axle 19 such that the fixing portion 40 functions as a hub axle nut. The frame contacting projection 48 projects outwardly from a peripheral edge area of the inner end face 44 in an axial direction. Thus, the frame contacting projection 48 is arranged and configured to be received in a mating opening or axle mounting slot 13a of the bicycle frame 13 to prevent relative rotation of the fixing portion 40 relative to the bicycle frame 13. The mounting slot 13a (mating opening) preferably has a width $W_1$ (FIG. 3) that is slightly larger than a width $W_2$ (FIG. 13) of the frame contacting projection 48. Thus, the frame contacting projection 48 can be easily slid into the slot 13a, yet relative rotational movement of the base portion 40 relative to the frame 13 can be prevented. In any case, when the frame 13 is clamped between the rear hub 18 and the fixing portion 40, the fixing portion 40 and the cable support structure 43 are non-movable relative to the frame 13.

The second outer end face 45 has a centrally located threaded fastening hole 49 and three axially extending projections 50. The threaded fastening hole 49 is arranged and configured to receive a fixing bolt 51 for attaching the derailleur support portion 41 and the cable support structure 43 on the fixing portion 40 such that the derailleur support portion 41 is mounted coaxially on the fixing portion 40 for limited relative movement and the cable support structure 43 is mounted on the fixing portion 40 in a non-rotatable manner. The three axially extending projections 50 are somewhat arc shaped members arranged on an imaginary circle that is coaxially arranged relative to the threaded fastening hole 49.

The stepped shaped peripheral surface 46 has four peripheral surfaces 52, 53, 54 and 55 with decreasing outer diameters, and three axially facing end surfaces 56, 57 and 58 extending between adjacent pairs of the peripheral surfaces 52, 53, 54 and 55. The peripheral surfaces 53 and 55 support the opposite ends of the derailleur support portion 41 in a rotatable manner. The peripheral surface 54 is spaced inwardly from the interior surface of the derailleur support portion 41 to form an annular space for accommodating the biasing element 42. The axially facing end surface 56 abuts one end of the derailleur support portion 41 to limit the axial movement on the fixing portion 40 towards the frame 13. The axially facing end surface 57 has an axially extending blind bore 59 for receiving one end of the biasing element 42 therein.

Referring now to FIGS. 2-10, the derailleur support portion 41 basically has a cable wire guide element 61, a tubular portion 62 and a linkage attachment portion 64. Preferably, the cable wire guide element 61, the tubular portion 62 and the linkage attachment portion 64 are integrally formed as a one-piece, unitary member from a hard, rigid material such as a lightweight metal (e.g. aluminum alloy). The tubular portion 62 is coaxially mounted on the fixing portion 40 for limited relative movement on the fixing portion 40, while the linkage attachment portion 64 has the linkage mechanism 32 coupled thereto by a pair of pivot pins.

The cable wire guide element 61 is a projection that has a through bore 61a formed therein. The cable wire guide element 61 extends from the linkage attachment portion 64. The through bore 61a is configured and arranged to receive the inner wire 24b therethrough. The bore 61a has a center axis that is arranged substantially perpendicular to the pivot axis P.

The tubular portion 62 has an axially extending abutment projection 62a that is configured to contact the frame contacting projection 48 and a bore 67 that is sized to rotatably receive the fixing portion 40 therein. More specifically, the biasing element 42 normally urges the abutment projection toward the frame contacting projection 48 (i.e. urges the derailleur support portion 41 in the counter clockwise direction as viewed in FIGS. 2-4). The bore 67 includes a first cylindrical section 68 with a first inner diameter, a second cylindrical section 69 with a second inner diameter and a third cylindrical section 70 with a third inner diameter. The first cylindrical section 68 is located at a first open end 71 of the bore 67, while the third cylindrical section 70 is located at a second open end 72 of the bore 67 with the second cylindrical section 69 located between the second cylindrical section 69 and the third cylindrical section 70. The second inner diameter of the second cylindrical section 69 is smaller than the first inner diameter of the first cylindrical section 68 to define an axially facing end wall 73 that extends radially between the first and second cylindrical sections 68 and 69.

The axially facing end wall 73 faces towards the first open end 71 of the bore 67, and has a pair of axially extending through bores 74 for receiving one end of the biasing element 42 therein. The holes 74 are circumferentially spaced from each other to provide a degree of torsional adjustment for the biasing element 42. Specifically, depending on which hole 74 the biasing element 42 engages, a different torsional force can be applied between the fixed portion 40 and the derailleur support portion 41. The second inner diameter of the second cylindrical section 69 is smaller than the third inner diameter of the third cylindrical section 70 to define an axially facing end wall 75 that extends radially between the second and third cylindrical sections 69 and 70. Preferably, a metal bushing 80 is disposed in the third cylindrical section 70.

When the tubular portion 62 of the, derailleur support portion 41 is coaxially mounted on the fixing portion 40, the first cylindrical section 68 is rotatably supported on the peripheral surface 53 of the fixing portion 40 and the second cylindrical section 69 is rotatably supported on the peripheral surface 55 of the fixing portion 40. The interior surface of the first cylindrical section 68 is radially spaced outwardly from the peripheral surface 54 of the fixing portion 40 to form an annular space for accommodating the biasing element 42. The axially facing end surface 56 abuts the end of the tubular portion 62 to limit the axial movement on the fixing portion 40 towards the frame 13.

Also when the tubular portion 62 of the derailleur support portion 41 is coaxially mounted on the fixing portion 40, the three protrusions 50 of the fixing portion 40 project outwardly beyond the tubular portion 62 of the derailleur support portion 41. Thus, the three protrusions 50 of the fixing portion 40 are arranged to non-rotatably engage the cable support structure 43 as explained below.

The biasing member 42 is preferably a coiled torsion spring or any other suitable torsional biasing device, which can be used to carry out the present invention. The biasing member 42 is preferably formed form a metallic wire that has a coiled portion 81 with a first end portion 82 extending axially from one end of the coiled portion 81 and a second end portion 83 extending axially from the other end of the coiled portion 81. The coiled portion 81 is located in the annular space formed between the interior surface of the first cylindrical section 68 and the peripheral surface 54 of the fixing portion 40. The first end portion 82 of the biasing member 42 is located in the blind bore 59 of the end surface 57 of the fixing portion 40, while the second end portion 83 of the biasing member 42 is located in one of the through bores 74 of the end wall 73 of the derailleur support portion 41. Thus, the biasing member 42 preferably applies a biasing force that urges the derailleur support portion 41 in a counter clockwise rotational direction on the fixing portion 40 about the pivot axis P that is coincident with the rotational axis R of the hub axle 19.

Due to the arrangement of the blind bore 59 and the holes 74, the biasing element 42 is preferably preloaded when the derailleur support portion 41 is in its initial rest position with the abutment projection 62a contacting the projection 48 of the fixing portion 40. Since the linkage attachment portion 64 of the derailleur support portion 41 is coupled to the linkage mechanism 32, the biasing member 42 urges the movable member 33 and the chain guide 34 together with the derailleur support portion 41 in a counter clockwise rotational direction relative to the fixing portion 40.

The linkage attachment portion 64 of the base member 31 is basically a U-shaped member that has a pair of mounting flanges 64a and 64b with pivot holes for attaching the inner and outer links 32a and 32b of the linkage mechanism 32 thereto by a pair of pivot pins. The linkage attachment portion 64 preferably has an adjustment mechanism that limits the range of movement of the movable member 33 relative to the base member 31. The adjustment mechanism is preferably formed by two adjustment screws that contact the inner and outer links 32a and 32b of the linkage mechanism 32 to limit pivot movement of the inner and outer links 32a and 32b. The linkage attachment portion 64 is not critical to the present invention. Thus, the linkage attachment portion 64 will not be explained in further detail, or illustrated in great detail herein.

Referring now to FIGS. 2-6 and 15-23, the cable support structure 43 of base member 31 is illustrated. The cable support structure 43 is configured and arranged to support the derailleur control cable 24. The cable support structure 43 basically has a mounting member 90 and a wire roller 91. The mounting member 90 is fixed to the fixing portion 40 by the bolt 51. The wire roller 91 rotatably mounted on the mounting member 90 by a pivot pin or screw 92. The wire roller 91 is rotatable about a roller axis X that is substantially parallel to the pivot axis P and offset from the pivot axis P.

The mounting member 90 has a first support portion 93, a second support portion 94 and a connecting portion 95. The connecting portion 95 extends between the first and second support portions 93 and 94 to form a roller receiving space in which the roller 91 is disposed. The first and second support portions 93 and 94 include two curved sections that are configured and arranged to form an outer casing receiving recess 96 for receiving the outer casing 24a of the derailleur control cable 24 therein. The mounting member 90 is preferably a one-piece, unitary member constructed from a hard, rigid material such a lightweight metal (e.g. aluminum alloy).

The first support portion 93 has a mounting aperture 97, three arc shaped recesses 98 and a threaded bore 99. The mounting aperture 97 is dimensioned to receive the bolt 51 therein to fixedly attach the mounting member 90 to the fixing portion 40. The three arc shaped recesses 98 are arranged in a circular pattern about the mounting aperture 97. The three arc shaped recesses 98 are configured and arranged to mate with the three axially extending projections 50 of the fixing portion 40 to prevent relative rotational movement between the fixing portion 40 and the cable support structure 43, when the cable support structure 43 is attached to the fixing portion 40 by the bolt 51.

The second support portion 94 has a non-threaded bore 100 that is axially aligned with the threaded bore 99 of the first support portion 93. The screw 92 is inserted through the non-threaded bore 100 and threaded into the threaded bore 99 of the first support portion 93 to rotatably secure the wire roller 91 between the first and second support portions 93 and 94.

The outer casing receiving recess 96 has a step shaped configuration with its center axis being aligned with the wire groove 91a formed in the peripheral surface of the wire roller 91. Thus, the outer casing receiving recess 96 is configured and arranged to contact the end of the outer casing 24a such that the inner wire 24b extends out of the outer casing 24a through the small portion of the outer casing receiving recess 96. When the derailleur control cable 24 is coupled to the rear derailleur 12, the end of the outer casing 24a contacts the outer casing receiving recess 96, while the inner wire 24b extends around a portion of the perimeter of the wire roller 91, through the bore 61a of the cable wire guide element 61, and is then attached to the linkage mechanism 32 by the wire attachment bolt 36.

The wire roller 91 basically includes the wire groove 91a, a central through bore 91b and a bushing 91c received in the through bore 91b. The wire roller 91 is preferably constructed of a lightweight rigid material such as plastic as a one-piece, unitary member. Then the metal bushing 91c is preferably mounted in the through bore 91b via a press fit or the like. The wire groove 91a is preferably arranged and configured to be substantially aligned with the bore 61a of the cable wire guide element 61 when the cable support structure 43 is coupled with the movable member 31.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur adapted to be attached to a bicycle frame having a rear hub attached thereto, the rear hub having a rear hub axle rotatably supporting a rear hub shell about a center axis of the rear hub axle that is non-movable relative to the bicycle frame when the rear hub is attached to the bicycle frame in a normal operating position, the bicycle rear derailleur comprising:

a base member configured to be coupled to the bicycle frame, the base member including a fixing portion configured and arranged to be releasably non-movably fixed to the bicycle frame and a derailleur support portion coupled to the fixing portion for rotation relative thereto about a pivot axis, the fixing portion being non-movable relative to the bicycle frame and the derailleur support portion being rotatable relative to the bicycle frame about the pivot axis when the bicycle rear derailleur is coupled to the bicycle frame in a fully installed operable state;

a movable member having a chain guide; and a linkage mechanism coupled between the derailleur support portion of the base member and the movable member to move the chain guide laterally between a first position and a second position, the pivot axis being coincident with the center axis of a rear hub axle when the bicycle rear derailleur is coupled to the bicycle frame in the fully installed operable state and the rear hub is attached to the bicycle frame in a normal operating position.

2. The bicycle rear derailleur according to claim 1, wherein the fixing portion includes fixing structure that is configured and arranged to be attached to an end of the rear hub axle such that the pivot axis is coincident with the center axis of the rear hub axle when the bicycle rear derailleur is coupled to the bicycle frame in the fully installed operable state and the rear hub is attached to the bicycle frame in the normal operating position.

3. The bicycle rear derailleur according to claim 1, wherein the base member includes a biasing member that urges the derailleur support portion in a rotational direction relative to the fixing portion.

4. The bicycle rear derailleur according to claim 1, wherein the fixing portion of the base member includes an axially facing surface with a projection extending axially therefrom that is arranged and configured to be received in a mating opening of the bicycle frame to prevent relative rotation of the fixing portion relative to the bicycle frame when the bicycle rear derailleur is coupled to the bicycle.

5. The bicycle rear derailleur according to claim 1, wherein the fixing portion of the base member includes an axially facing surface with a projection extending axially therefrom that is arranged and configured to be received in an axle mounting slot of the bicycle frame when the bicycle rear derailleur is coupled to the bicycle frame.

6. The bicycle rear derailleur according to claim 1, wherein the fixing portion of the base member includes a threaded mounting hole configured and arranged to threadedly receive a threaded end of the rear hub axle.

7. The bicycle rear derailleur according to claim 1, wherein the base member includes a cable support structure that is adapted to support a derailleur control cable.

8. The bicycle rear derailleur according to claim 7, wherein the cable support structure includes a mounting member and a wire roller that is rotatably coupled to the mounting member.

9. The bicycle rear derailleur according to claim 8, wherein the wire roller is rotatable about a roller axis that is substantially parallel to the pivot axis and offset from the pivot axis.

10. The bicycle rear derailleur according to claim 8, wherein the mounting member includes an outer casing receiving recess, which is configured and arranged to receive an outer casing of the derailleur control cable partially therein and is configured and arranged to receive an inner wire of the derailleur control cable therethrough.

11. The bicycle rear derailleur according to claim 7, wherein the cable support structure includes a mounting member with an outer casing receiving recess, which is configured and arranged to receive an outer casing of the derailleur control cable partially therein and is configured and arranged to receive an inner wire of the derailleur control cable therethrough.

12. The bicycle rear derailleur according to claim 7, wherein
the derailleur support portion includes a cable guide element configured and arranged to receive an inner wire of the derailleur control cable that extends from the cable support structure.

13. A bicycle rear derailleur adapted to be controlled by a derailleur control cable and adapted to be attached to a bicycle frame having a rear hub attached thereto and, the rear hub having a rear hub axle rotatably supporting a rear hub shell about a center axis of the rear hub axle that is non-movable relative to the bicycle frame when the rear hub is attached to the bicycle frame in a normal operating position, the bicycle rear derailleur comprising:
a base member configured to be coupled to the bicycle frame, the base member including a fixing portion configured and arranged to be releasably non-movably fixed to the bicycle frame and a derailleur support portion coupled to the fixing portion for rotation relative thereto about a pivot axis, the fixing portion being non-movable relative to the bicycle frame and the derailleur support portion being rotatable relative to the bicycle frame about the pivot axis when the bicycle rear derailleur is coupled to the bicycle frame in a fully installed operable state;
a movable member having a chain guide portion; and
a linkage mechanism coupled between the derailleur support portion of the base member and the movable member to move the chain guide portion between a retracted position and an extended position,
the fixing portion of the base member including a cable support structure fixedly attached thereto with an outer casing receiving part non-movably arranged relative to the fixing portion to support an outer casing of the derailleur control cable when the bicycle rear derailleur is coupled to the bicycle frame in the fully installed operable state.

14. The bicycle rear derailleur according to claim 13, wherein
the base member includes a biasing member that urges the derailleur support portion in a rotational direction relative to the fixing portion.

15. The bicycle rear derailleur according to claim 13, wherein
the fixing portion of the base member includes an axially facing surface with a projection extending axially therefrom that is arranged and configured to be received in a mating opening of the bicycle frame to prevent relative rotation of the fixing portion relative to the bicycle frame when the bicycle rear derailleur is coupled to the bicycle.

16. The bicycle rear derailleur according to claim 13, wherein
the fixing portion of the base member includes an axially facing surface with a projection extending axially therefrom that is arranged and configured to be received in an axle mounting slot of the bicycle frame when the bicycle rear derailleur is coupled to the bicycle frame.

17. The bicycle rear derailleur according to claim 16, wherein
the fixing portion includes fixing structure that is configured and arranged to be attached to an end of the rear hub axle such that the pivot axis is coincident with the center axis of the rear hub axle when the bicycle rear derailleur is coupled to the bicycle frame in the fully installed operable state and the rear hub is attached to the bicycle frame in the normal operating position.

18. The bicycle rear derailleur according to claim 13, wherein
the fixing portion includes fixing structure that is configured and arranged to be attached to an end of the rear hub axle such that the pivot axis is coincident with the center axis of the rear hub axle when the bicycle rear derailleur is coupled to the bicycle frame in the fully installed operable state and the rear hub is attached to the bicycle frame in the normal operating position.

19. The bicycle rear derailleur according to claim 18, wherein
the fixing portion of the base member includes a threaded mounting hole configured and arranged to threadedly receive a threaded end of the rear hub axle.

20. The bicycle rear derailleur according to claim 13, wherein
the cable support structure includes a mounting member with a wire roller that is rotatably coupled to the mounting member.

21. The bicycle rear derailleur according to claim 20, wherein
the wire roller is rotatable about a roller axis that is substantially parallel to the pivot axis and offset from the pivot axis.

22. The bicycle rear derailleur according to claim 21, wherein
the roller axis is non-movably fixed relative to the pivot axis when the bicycle rear derailleur is coupled to the bicycle frame in the fully installed operable state.

23. The bicycle rear derailleur according to claim 20, wherein
the mounting member includes the outer casing receiving part, and the outer casing receiving part has an outer casing receiving recess that is configured and arranged to receive the outer casing of the derailleur control cable partially therein and that is configured and arranged to receive an inner wire of the derailleur control cable therethrough.

24. The bicycle rear derailleur according to claim 23, wherein
the mounting member is non-movable relative to the fixing portion.

25. The bicycle rear derailleur according to claim 13, wherein
the cable support structure includes a mounting member having the outer casing receiving part, and the outer casing receiving part has an outer casing receiving recess that is configured and arranged to receive the outer casing of the derailleur control cable partially therein and that is configured and arranged to receive an inner wire of the derailleur control cable therethrough.

26. The bicycle rear derailleur according to claim 25, wherein
the mounting member is non-movable relative to the fixing portion.

27. The bicycle rear derailleur according to claim 13, wherein
the derailleur support portion includes a cable guide element configured and arranged to receive an inner wire of the derailleur control cable that extends from outer casing receiving part of the cable support structure.

* * * * *